(12) United States Patent
Maziers et al.

(10) Patent No.: US 10,265,924 B2
(45) Date of Patent: *Apr. 23, 2019

(54) MULTILAYERED ARTICLES

(71) Applicants: Total Research & Technology Feluy, Seneffe (Feluy) (FR); Polynt Composites France, Drocourt (FR)

(72) Inventors: Eric Maziers, Seneffe (BE); Thierry Foussard, Hersin Coupigny (FR); Geoffrey Devis, Harnes (FR)

(73) Assignees: TOTAL RESEARCH & TECHNOLOGY FELUY, Seneffe (BE); POLYNT COMPOSITES FRANCE, Drocourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/510,307

(22) PCT Filed: Sep. 11, 2015

(86) PCT No.: PCT/EP2015/070814
§ 371 (c)(1),
(2) Date: Mar. 10, 2017

(87) PCT Pub. No.: WO2016/038182
PCT Pub. Date: Mar. 17, 2016

(65) Prior Publication Data
US 2017/0253002 A1 Sep. 7, 2017

(30) Foreign Application Priority Data
Sep. 11, 2014 (EP) .................................. 14290270

(51) Int. Cl.
| | | |
|---|---|---|
| *B32B 1/08* | (2006.01) | |
| *B32B 5/02* | (2006.01) | |
| *B32B 5/08* | (2006.01) | |
| *B32B 5/22* | (2006.01) | |
| *B32B 5/26* | (2006.01) | |
| *B32B 27/08* | (2006.01) | |
| *B32B 27/12* | (2006.01) | |
| *B32B 27/18* | (2006.01) | |
| *B32B 27/20* | (2006.01) | |

(Continued)

(52) U.S. Cl.
CPC .................. *B32B 1/08* (2013.01); *B32B 5/02* (2013.01); *B32B 5/08* (2013.01); *B32B 5/22* (2013.01); *B32B 5/26* (2013.01); *B32B 27/08* (2013.01); *B32B 27/12* (2013.01); *B32B 27/18* (2013.01); *B32B 27/20* (2013.01); *B32B 27/30* (2013.01); *B32B 27/302* (2013.01); *B32B 27/32* (2013.01); *B32B 27/327* (2013.01); *B32B 27/34* (2013.01); *B32B 27/36* (2013.01); *B32B 27/38* (2013.01); *B32B 2255/02* (2013.01); *B32B 2255/10* (2013.01); *B32B 2255/24* (2013.01); *B32B 2255/26* (2013.01); *B32B 2260/021* (2013.01); *B32B 2260/046* (2013.01); *B32B 2262/02* (2013.01); *B32B 2262/0253* (2013.01); *B32B 2262/0261* (2013.01); *B32B 2262/0269* (2013.01); *B32B 2262/0276* (2013.01); *B32B 2262/101* (2013.01); *B32B 2262/106* (2013.01); *B32B 2262/12* (2013.01); *B32B 2270/00* (2013.01); *B32B 2307/3065* (2013.01); *B32B 2307/50* (2013.01); *B32B 2307/558* (2013.01); *B32B 2597/00* (2013.01)

(58) Field of Classification Search
CPC B32B 1/008; B32B 5/02; B32B 27/08; B32B 27/12; B32B 27/18; B32B 27/30; B32B 27/32; B32B 27/36; B32B 27/38; B32B 2307/3065; B32B 2597/00
USPC ..................................................... 428/473.5
See application file for complete search history.

(56) References Cited

U.S. PATENT DOCUMENTS

| | | | |
|---|---|---|---|
| 4,201,826 A * | 5/1980 | Nylander ................ | C08L 67/06 442/391 |
| 4,504,530 A | 3/1985 | Bliley | |
| 5,053,485 A | 10/1991 | Nieuwenhuis et al. | |
| 5,053,522 A | 10/1991 | Muller | |
| 5,117,008 A | 5/1992 | Bhatia et al. | |
| 2006/0196404 A1 * | 9/2006 | Gulden ..................... | B32B 7/10 114/355 |

FOREIGN PATENT DOCUMENTS

| | | |
|---|---|---|
| DE | 10008321 A1 | 8/2001 |
| FR | 2843390 A1 | 2/2004 |

(Continued)

OTHER PUBLICATIONS

International Search Report issued in PCT/EP2015/070814, dated Dec. 10, 2015, 3 pages.

(Continued)

*Primary Examiner* — Hui H Chin
(74) *Attorney, Agent, or Firm* — Albert Shung

(57) ABSTRACT

Disclosed herein are an article and a method for preparing the article. The article comprises at least one layer A comprising fibers embedded in a composition comprising at least one vinyl ester resin; and a layer B comprising from 40 to 100% by weight relative to the total weight of said layer B of at least one thermoplastic polyester; from 0 to 60% by weight relative to the total weight of said layer B of a polyolefin composition; said composition comprising at least one polyolefin; and from 0 to 20% by weight relative to the total weight of said layer B of at least one additive selected from compatibilizing agent and/or impact modifier. Layer B may comprise a blow-molded layer, an injected-molded layer, an extruded-thermoformed layer, a sheet-extruded layer, a pipe-extruded layer, and an injection stretch blow-molded layer. Layer A may be in contact with layer B.

13 Claims, 2 Drawing Sheets

(51) Int. Cl.
  *B32B 27/30* (2006.01)
  *B32B 27/32* (2006.01)
  *B32B 27/34* (2006.01)
  *B32B 27/36* (2006.01)
  *B32B 27/38* (2006.01)

(56) References Cited

FOREIGN PATENT DOCUMENTS

| WO | 1998002480 A1 | 1/1998 |
| WO | 2008037772 A1 | 4/2008 |
| WO | 2010081887 A1 | 7/2010 |
| WO | 2010097463 A1 | 9/2010 |
| WO | 2011144625 A1 | 11/2011 |
| WO | 2014135459 A1 | 9/2014 |

OTHER PUBLICATIONS

Plastics Additives Handbook, ed. H. Zweifel, 5th edition, 2001, Hanser Publishers.
EP Application No. 11167138; "Process for the Polymerization of Cyclic Carbonates"; Filing date: May 23, 2011; 24 pages.
N.C. Lee, Practical Guide to Blow Moulding, Rapra Technology Limited, Shrewsbury, 2006.

\* cited by examiner

US 10,265,924 B2

MULTILAYERED ARTICLES

CROSS-REFERENCE TO RELATED APPLICATIONS

This application claims the benefit of PCT/EP2015/070814, filed Sep. 11, 2015, which claims priority from EP 14290270.9 filed Sep. 11, 2014.

FIELD OF THE INVENTION

The invention pertains to multilayered articles, in particular at least one layer comprising a thermoplastic polyester, said layer being selected from blow moulded layer, injected moulded layer, extruded-thermoformed layer, a sheet extruded layer, pipe extruded layer, or injection stretch-blow moulded layer.

BACKGROUND OF THE INVENTION

Attempts have been made to utilize thermoplastic polyesters such as polylactic acid (PLA) for various end-use applications. However, PLA is known to be brittle and exhibit low toughness, which can result in low impact strength products or articles. There thus exists a need to produce articles with improved mechanical properties.

Therefore, an object of this invention is to provide a multilayered article comprising a polyester such as polylactic acid having improved mechanical properties, in particular improved impact strength and/or stiffness.

Another object of this invention is to provide a multilayered article having good adherence between the layers.

At least one of the objects mentioned above is carried out with the present invention.

SUMMARY OF THE INVENTION

The applicant found in a surprising way that by providing an article comprising (i) at least one first layer comprising fibers embedded in a composition comprising at least one vinyl ester resin, and (ii) one second layer comprising a polyester, for example poly(lactic acid), the disadvantages mentioned above may be overcome.

According to a first aspect of the present invention an article is provided comprising
  (i) at least one layer A comprising fibers embedded in a composition comprising at least one vinyl ester resin; and
  (ii) a layer B comprising:
    from 40 to 100%, preferably from 75 to 100% by weight relative to the total weight of said layer B of at least one thermoplastic polyester;
    from 0 to 60% by weight relative to the total weight of said layer B of a polyolefin composition; said composition comprising at least one polyolefin, preferably said at least one polyolefin is polyethylene; and
    from 0 to 20% by weight relative to the total weight of said layer B of at least one additive selected from compatibilizing agent and/or impact modifier;
    wherein said layer B is selected from the group comprising a blow moulded layer, an injected moulded layer, an extruded-thermoformed layer, a sheet extruded layer, a pipe extruded layer, and an injection stretch-blow moulded layer, and
    wherein at least one layer A is in contact with layer B.

The multilayered article according to the first aspect of the invention has good adherence between the layers.

According to a second aspect, the present invention also encompasses a method for preparing an article according to the first aspect of the invention, comprising the steps of
  (i) forming a layer B; wherein said layer B is formed by a process selected from the group comprising blow moulding, injection moulding, extrusion-thermoforming, sheet extrusion, pipe extrusion, and injection stretch-blow moulding; said layer B comprising:
    from 40 to 100%, preferably from 75 to 100% by weight relative to the total weight of said layer B of at least one thermoplastic polyester;
    from 0 to 60% by weight relative to the total weight of said layer B of a polyolefin composition; said composition comprising at least one polyolefin, preferably said at least one polyolefin is polyethylene; and
    from 0 to 20% by weight relative to the total weight of said layer B of at least one additive selected from compatibilizing agent and/or impact modifier;
  (ii) applying to at least a part of one of the surface of layer B at least one layer A comprising fibers embedded in a composition comprising at least one vinyl ester resin;
  wherein at least one layer A is contacting layer B, thereby obtaining the article according to the first aspect of the invention.

DETAILED DESCRIPTION OF THE INVENTION

Figure 1:
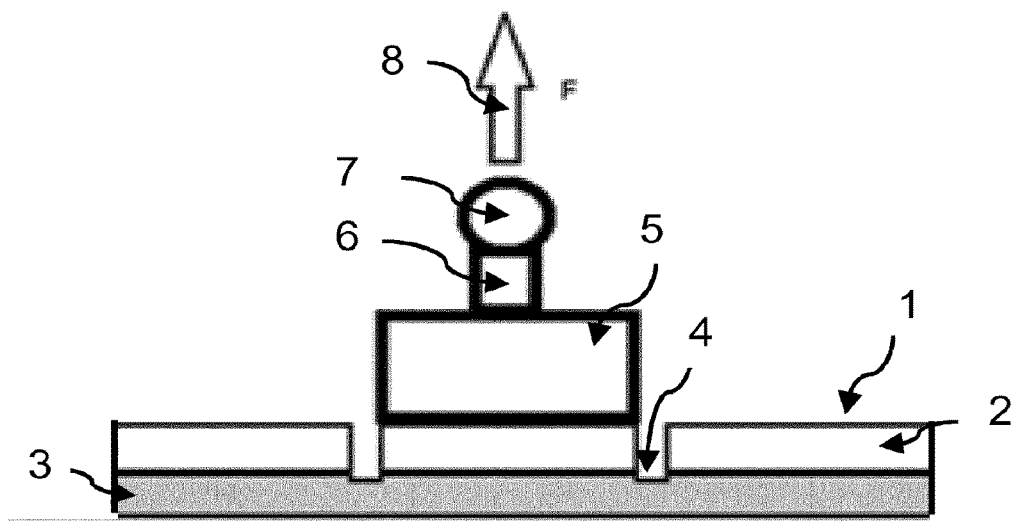
FIG. 1 schematically represents a test sample comprising a metal disk glued on a test area.

When describing the invention, the terms used are to be construed in accordance with the following definitions, unless a context dictates otherwise.

As used in the specification and the appended claims, the singular forms "a", "an," and "the" include both singular and plural referents unless the context clearly dictates otherwise. By way of example, "a resin" means one resin or more than one resin.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

Reference throughout this specification to "one embodiment" or "an embodiment" means that a particular feature, structure or characteristic described in connection with the embodiment is included in at least one embodiment of the present invention. Thus, while some embodiments described herein include some but not other features included in other embodiments, combinations of features of different embodiments are meant to be within the scope of the invention, and form different embodiments, as would be understood by those in the art.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

The term "about" as used herein when referring to a measurable value such as a parameter, an amount, a temporal duration, and the like, indicate that a value includes the standard deviation of error for the device or method being employed to determine the value. Preferably the term "about" is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

Whenever the term "substituted" is used herein, it is meant to indicate that one or more hydrogens on the atom indicated in the expression using "substituted" is replaced with a selection from the indicated group, provided that the indicated atom's normal valency is not exceeded, and that the substitution results in a chemically stable compound, i.e. a compound that is sufficiently robust to survive isolation from a reaction mixture.

The term "hydroxyl" or "hydroxy" as used herein refers to the group —OH.

The term "carboxy" or "carboxyl" or "hydroxycarbonyl" as used herein refers to the group —C(=O)OH.

The term "$C_{1-6}$ alkyl", as a group or part of a group, refers to a hydrocarbyl group of Formula —$C_nH_{2n+1}$ wherein n is a number ranging from 1 to 6. Thus, for example, $C_{1-6}$ alkyl groups include all linear, or branched alkyl groups having 1 to 6 carbon atoms, and thus includes for example methyl, ethyl, n-propyl, i-propyl, butyl and its isomers (e.g. n-butyl, i-butyl and t-butyl); pentyl and its isomers, hexyl and its isomers.

When the suffix "ene" is used in conjunction with an alkyl group, i.e. "alkylene", this is intended to mean the alkyl group as defined herein having two single bonds as points of attachment to other groups. As used herein, the term "$C_{1-6}$ alkylene", by itself or as part of another substituent, refers to $C_{1-6}$ alkyl groups that are divalent, i.e., with two single bonds for attachment to two other groups. Non-limiting examples of $C_{1-6}$ alkylene groups include methylene (—$CH_2$—), ethylene (—$CH_2$—$CH_2$—), methylmethylene (—CH($CH_3$)—), 1-methyl-ethylene (—CH($CH_3$)—$CH_2$—), n-propylene (—$CH_2$—$CH_2$—$CH_2$—), 2-methylpropylene (—$CH_2$—CH($CH_3$)—$CH_2$—), 3-methylpropylene (—$CH_2$—$CH_2$—CH($CH_3$)—), n-butylene (—$CH_2$—$CH_2$—$CH_2$—$CH_2$—), 2-methylbutylene (—$CH_2$—CH($CH_3$)—$CH_2$—$CH_2$—), 4-methylbutylene (—$CH_2$—$CH_2$—$CH_2$—CH($CH_3$)—), pentylene and its chain isomers, hexylene and its chain isomers.

The term "$C_{2-6}$ alkenyl" refers to an unsaturated hydrocarbyl group, which may be linear, or branched comprising one or more carbon-carbon double bonds and comprising from 2 to 6 carbon atoms. Examples of $C_{2-6}$ alkenyl groups are ethenyl, 2-propenyl, 2-butenyl, 3-butenyl, 2-pentenyl and its isomers, 2-hexenyl and its isomers, 2,4-pentadienyl, and the like. Where alkenyl groups as defined herein are divalent groups having single bonds for attachment to two other groups, they are termed "alkenylene".

The term "$C_{2-6}$ alkynyl" refers to an unsaturated hydrocarbyl group, which may be linear, or branched comprising one or more carbon-carbon triple bonds and comprising from 2 to 6 carbon atoms. Non limiting examples of $C_{2-6}$ alkynyl groups include ethynyl, 2-propynyl, 2-butynyl, 3-butynyl, 2-pentynyl and its chain isomers, 2-hexynyl and its chain isomers, and the like. Where alkynyl groups as defined herein are divalent groups having single bonds for attachment to two other groups, they are termed "alkynylene".

The term "$C_{1-6}$ alkyloxycarbonyl" as a group or part of a group, refers to a group of formula —C(=O)O—$R^a$ wherein $R^a$ is $C_{1-6}$ alkyl as defined herein.

The term "$C_{6-12}$aryl", as a group or part of a group, refers to a polyunsaturated, aromatic hydrocarbyl group having a single ring (i.e. phenyl) or multiple aromatic rings fused together (e.g. naphthalene), or linked covalently, typically containing 6 to 12 atoms; wherein at least one ring is aromatic. The aromatic ring may optionally include one to two additional rings (either cycloalkyl, heterocyclyl or heteroaryl) fused thereto. Examples of suitable aryl include $C_{6-10}$aryl, more preferably $C_{6-8}$aryl. Non-limiting examples of $C_{6-12}$aryl comprise phenyl, biphenylyl, biphenylenyl, or 1- or 2-naphthanelyl; 5- or 6-tetralinyl, 1-, 2-, 3-, 4-, 5-, 6-, 7- or 8-azulenyl, 4-, 5-, 6 or 7-indenyl, 4- or 5-indanyl, 5-, 6-, 7- or 8-tetrahydronaphthyl, 1,2,3,4-tetrahydronaphthyl, and 1,4-dihydronaphthyl. When the suffix "ene" is used in conjunction with an aryl group, this is intended to mean the aryl group as defined herein having two single bonds as points of attachment to other groups. Suitable arylene groups include 1,4-phenylene, 1,2-phenylene, 1,3-phenylene, biphenylylene, naphthylene, indenylene, and the like. Where a carbon atom in an aryl group is replaced with a heteroatom, the resultant ring is referred to herein as a heteroaryl ring. Where a carbon atom in a cycloalkyl group is replaced with a heteroatom, the resultant ring is referred to herein as a heterocyclyl ring.

The term "$C_{6-12}$aryl$C_{1-6}$alkyl", as a group or part of a group, means a $C_{1-6}$alkyl as defined herein, wherein at least one hydrogen atom is replaced by at least one $C_{6-12}$aryl as defined herein. Non-limiting examples of $C_{6-12}$aryl$C_{1-6}$alkyl group include benzyl, phenethyl, dibenzylmethyl, 3-(2-naphthyl)-butyl, and the like.

The term "$C_{6-12}$aryl$C_{2-6}$alkenyl", as a group or part of a group, means a $C_{1-6}$alkenyl as defined herein, wherein at least one hydrogen atom is replaced by at least one $C_{6-12}$aryl as defined herein.

The terms described above and others used in the specification are well understood to those in the art.

1. Layer A

The article described herein comprises at least one layer A, comprising fibers embedded in a composition comprising at least vinyl ester resin. The vinyl ester resin is a thermosetting resin. The layer(s) A may provide improved mechanical properties to the article, such as an improved stiffness. In an embodiment, at least one layer A will form an outer layer of the article. In another embodiment, at least one layer A will form the inner layer of the article. Preferably, layer A is a laminate (stratified comprising a matrix resin and fibers embedded within at least a portion of the matrix resin), also known as "polymer matrix composite material", the matrix resin is a composition comprising at least one vinyl ester resin. The term "laminate" as used herein has its ordinary meaning as known to those skilled in the art and thus refers to association of resins and structural reinforcement elements. The matrix resin may be present in a partially cured or uncured state.

The thickness of each layer A can typically range between 0.1 mm and 10 mm, preferably between 0.1 mm and 5 mm, preferably between 0.5 mm and 3 mm.

Each layer A may cover the underlying layer completely or partially. Thus, in certain embodiments, some parts of the surface of the article may be constituted by one or more layers A, whereas other parts of the surface may be constituted by another layer, such as layer B.

The article may comprise a single layer A, or two or more layers A. In some embodiments, the article comprises at least two layers A, for example at least three layers A, for example at least four layers A, for example at least five layers A. The type of fibers and/or resin composition in two (adjacent) layers A may be identical. However, it is envisaged that two or more layers A may comprise different types of fibers and/or resin composition. In certain embodiments, the article may comprise at least one first layer A comprising carbon fibers, and at least one second layer A comprising glass fibers. In certain embodiments, the article may comprise more than one layer A comprising glass fibers (fiberglass).

Each layer A comprises fibers embedded in a composition comprising at least one vinyl ester resin.

1.1. Fibers

The term "fiber" as used herein has its ordinary meaning as known to those skilled in the art and may include one or more fibrous materials adapted for the preparation of layer A. Fibers may take the form of any of continuous fibers, short fibers, flakes, whiskers, sheets, plies, powders, wires, microspheres, nanospheres; and combinations thereof.

In some embodiments, the fibers may further adopt any of unidirectional, multi-dimensional (e.g. two- or three-dimensional), non-woven, woven, knitted, stitched, wound, and braided configurations, as well as swirl mat, felt mat, and chopped mat structures. In some embodiments, the fibers can be provided as fabrics that can have a plain, twill, harness satin, or crow-foot satin weave.

The composition of the fibers may be varied as necessary. In some preferred embodiment, suitable fibers are selected from the group comprising glass fibers, carbon fibers, aramid fibers (such as Kevlar® fibers), poly(lactic acid) (PLA) fibers, polypropylene (PP) fibers, PLA stereocomplex fibers, poly(lactic acid)-poly(butylene adipate-co-terephthalate) (PLA-PBAT) fibers, quartz fibers (such as Astroquartz®), polyethylene fibers, polyester fibers, graphite fibers, poly-p-phenylene-benzobisoxazole (PBO) fibers, boron fibers, silicon carbide fibers (such as Tyranno® fibers or Nicalon® fibers), polyamide fibers (such as Nylon® fibers), silicon nitride fibers, aluminum oxide fibers (such as Nextel® fibers), metal fibers, natural fibers, thermoplastic bi-component fibers, maleic anhydride grafted thermoplastic fibers, ozone treated thermoplastic fibers, gamma irradiated thermoplastic fiber; and combinations thereof. In some more preferred embodiments, the fibers are selected from the group comprising carbon fibers, fiberglass, and aramid fibers, or blends thereof.

Metals and their alloys may be employed as preferable conductive constituents in view of their relatively high electrical conductivity if conductive fibers are envisaged. Examples of metals and alloys may include, but are not limited to, silver, gold, nickel, copper, aluminum, and alloys and mixtures thereof. In certain embodiments, the morphology of the conductive metal additives may include one or more of fibers, flakes, powders, wires, microspheres, and nanospheres, singly or in combination.

1.2. Composition for Embedding the Fibers of Layer A

In layer A, the fibers are embedded in a "resin composition" also referred as "composition" comprising at least one vinyl ester resin. The "resin composition" is a thermosetting composition.

In some preferred embodiments, the vinyl ester resin, is the reaction product of a process comprising the step of contacting: at least one compound comprising at least one epoxy group per compound; preferably having at least two epoxy groups per compound; with at least one compound selected from the group comprising compound of formula $R^1$—C(=O)—O—$R^2$, and compound of formula (a); and optionally at least one isocyanate;

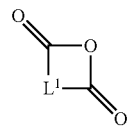

(a)

wherein $R^1$ is selected from the group comprising $C_{1-6}$alkyl, $C_{2-6}$alkenyl, $C_{2-6}$alkynyl, $C_{6-12}$aryl, $C_{6-12}$aryl$C_{1-6}$alkyl, and $C_{6-12}$aryl$C_{2-6}$alkenyl; each group being optionally substituted with one or more substituents independently selected from the group comprising $C_{1-6}$alkyl, $C_{2-6}$alkenyl, $C_{2-6}$alkynyl; carboxyl, hydroxyl, $C_{1-6}$alkyloxycarbonyl, $C_{2-6}$alkenyloxycarbonyl, $C_{2-6}$ alkynyloxycarbonyl and $C_{6-12}$ aryl, and wherein $R^2$ is hydrogen or is selected from the group comprising $C_{1-6}$alkyl, $C_{2-6}$alkenyl, $C_{2-6}$alkynyl; $C_{6-12}$aryl, $C_{6-12}$aryl$C_{1-6}$alkyl, and $C_{6-12}$aryl$C_{2-6}$alkenyl; each group being optionally substituted with one or more substituents independently selected from the group comprising $C_{1-6}$alkyl, $C_{2-6}$alkenyl, $C_{2-6}$alkynyl; carboxyl, hydroxyl, $C_{1-6}$alkyloxycarbonyl, $C_{2-6}$alkenyloxycarbonyl, $C_{2-6}$alkynyloxycarbonyl; and wherein $L^1$ is a $C_{2-6}$alkenylene optionally substituted with one or more hydroxyl or $C_{1-6}$ alkyl.

In some preferred embodiments, the vinyl ester resin, is the reaction product of a process comprising the step of contacting (i) at least one compound comprising at least one epoxy group per compound; preferably having at least two epoxy groups per compound; with (ii) at least one acrylic or methacrylic acid, or an ester thereof, preferably with at least one methacrylic acid or ester thereof.

Suitable compound comprising at least one epoxy group per compound may be produced by the attachment of an epoxide group to both ends of a paraffinic hydrocarbon chain (for example, diepoxides derived from butanediol) or of a polyether chain, such as α-ω-diepoxy polypropylene glycol. Diepoxy resins suitable for said reaction include but are not limited to vinylcyclo hexene dioxide, 3,4-epoxycyclohexylmethyl 3,4-epoxycyclohexanemono carboxylate, 3-(3,4-epoxycyclohexyl)-8,9-epoxy-2,4-dioxaspiro-[5.5]undecane, bis(2,3-epoxycyclopentyl) ether, bis(3,4-epoxy-6-methylcyclohexyl) adipate and resorcinol diglycidyl ether. Other suitable compound comprising at least one epoxy group per compound can contain more than two epoxide functional groups per molecule, such as epoxidized soya oils, polyglycidyl ethers of phenolic resins of the novolak type, p-aminophenoltriglycidyl ether or 1,1,2,2-tetra(p-hydroxyphenyl) ethane tetraglycidyl ether. A preferred class of suitable compound comprising at least one epoxy group per compound comprises the epoxy polyethers obtained by reacting an epihalohydrin (such as epichlorohydrin or epibromohydrin) with a polyphenol, optionally in the presence of an alkali. Suitable polyphenols include bis(4-hydroxyphenyl)-2,2-propane (i.e. bisphenol A); resorcinol, catechol, hydroquinone, bis(4-hydroxyphenyl)-1,1-isobutane, 4,4-dihydroxybenzophenone; bis(4-hydroxyphenyl-1,1-ethane; bis (2-hydroxyphenyl)-methane; 1,5-hydroxynaphthalene, and any combination thereof. Other suitable compounds comprising at least one epoxy group per compound can be a polyglycidyl ether of a polyphenol, such as bisphenol A; such as epoxy resins of the novolac type. Another class of epoxy resin suitable for the reaction comprises the hydrogenated epoxy resin based on bisphenol A such as Eponex 1510 from Shell. Other examples of suitable epoxy resins are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, 1,5-pentanediol, 1,2,6-hexane-triol, glycerol, trimethylolpropane, and bis(4-hydroxycyclohexyl)-2,2-propane.

Preferably, the at least one compound comprising at least one epoxy group per compound is the reaction product of a process comprising the step of contacting at least one epihalohydrin with at least one polyphenol. Preferably, the epihalohydrin is selected from epichlorohydrin or epibromohydrin. Preferably, the polyphenol is selected from the group comprising bis(4-hydroxyphenyl)-2,2-propane, bis(4-hydroxyphenyl)-1,1-isobutane, 4,4-dihydroxybenzophenone; bis(4-hydroxyphenyl-1,1-ethane; bis(2-hydroxynaphenyl)-methane; resorcinol, catechol, hydroquinone, 1,5-hydroxynaphthalene, and any combination thereof.

Preferably, the vinyl ester resin, is the reaction product of a process comprising the step of contacting at least one compound comprising at least one epoxy group per compound, with at least one methacrylic acid or an ester thereof, wherein the at least one compound comprising at least one epoxy group per compound is produced by contacting an epihalohydrin with bis(4-hydroxyphenyl)-2,2-propane. Preferably, the at least one compound comprising at least one epoxy group per compound is a polyglycidyl ether of a polyphenol. Preferably the vinyl ester resin comprises the reaction product of polyglycidyl ether of a polyphenol with methacrylic acid. The composition of the at least one layer A may further comprise one or more constituents selected from the group comprising reactive diluents, solvents, driers, other curing agents; catalysts; additives, fillers, and stabilizers.

In an embodiment, the composition of the at least one layer A comprises at least one reactive diluent, preferably selected from the group comprising styrene: vinyl toluene: (meth)acrylate (such as methylmethacrylate, acrylate, methacrylate, glycidyl methacrylate, hydroxyl methyl methacrylate, hydroxy propylmethacrylate, acrylic acid, and methacrylic acid); and a combination thereof. Preferably, the reactive diluent is selected from the group comprising vinyl toluene; (meth)acrylate (such as methylmethacrylate, acrylate, methacrylate, glycidyl methacrylate, hydroxyl methyl methacrylate, hydroxy propylmethacrylate, acrylic acid, and methacrylic acid); and a combination thereof.

Preferably, the composition of the at least one layer A further comprises:
- at least one reactive diluent, preferably wherein said at least one reactive diluent is selected from the group comprising styrene; vinyl toluene; (meth)acrylate; and a combination thereof, and/or
- at least one catalyst, wherein the at least one catalyst is an organic peroxide, preferably the at least one catalyst is methyl ethyl ketone peroxide.

In an embodiment, the composition comprises at least 45% by weight of styrene, for example at least 46% of styrene, for example at least 47% by weight of styrene with % by weight based on the total weight of the composition. In an embodiment, the composition comprises at most 50% by weight of styrene, for example at most 49% by weight, for example at most 48% by weight of styrene.

Preferably, the composition is substantially styrene free. As used herein, the term "substantially free" means that the material being discussed is present in the composition, if at all, as an incidental impurity. In other words, the material does not affect the properties of the composition. In an embodiment, the composition comprises at most 0.01% by weight of styrene, with % by weight based on the total weight of the composition, preferably at most 0.001% by weight. Preferably the composition is styrene free, with the meaning that styrene is not present in the composition at all.

In an embodiment, the composition of the at least one layer A further comprises one or more components selected from a drier and a catalyst. As used herein, the term "drier" (which is also referred to synonymously as "accelerator" or "promoter"—) refers to organometallic compounds and/or amine compounds such as aromatic tertiary amines. They are added to unsaturated resins in order to appreciably reduce their drying times, i.e. the transition of their liquid films to the solid phase. Driers are available either as solids or in solution. The driers are present in amounts expressed as weight percent of the metal based on the weight of resin solids unless stated otherwise.

In some preferred embodiments of the invention, the resin composition of the at least one layer A comprises at least one metal salt of an organic acid and optionally at least one amine promoter, for example a cobalt salt of an organic acid and optionally at least one aromatic tertiary amine. Preferably the organic acid is a carboxylate. Preferably, the organic acid is selected from branched-chain or straight-chain saturated and unsaturated aliphatic, aromatic and alicyclic monocarboxylic acids having 6 to 22 carbon atoms, cycloaliphatic monocarboxylic acids having 6 to 10 carbon atoms, or mixtures of these acids, preferably the organic acid is selected from the group comprising 2-ethylhexanoic acid, 2-ethylbutanoic acid, 2,2-dimethylpentanoic acid, 2-ethylpentanoic acid, 2-ethyl-4-methylpentanoic acid, isooctanoic acid, isononanoic acid, neononanoic acid, nonanoic acid, isodecanoic acid, neodecanoic acid, 2-ethyldecanoic acid, isotridecanoic acid, isotetradecanoic acid, n-hexanoic acid, n-octanoic acid, n-decanoic acid, n-dodecanoic acid, cyclopentanoic acid, cyclohexanoic acid, 1,2-dimethylcyclohexanoic acid, cycloheptanoic acid, myristic acid, stearic acid, arachidic acid, behenic acid, oleic acid, linoleic acid, tall oil fatty acid, erucic acid, p-tert-butylbenzoic acid, monobutyl maleate, monodecyl phthalate, naphthenic acid and mixtures thereof. In an embodiment, the optional aromatic tertiary amine can be selected from the group comprising dimethylaniline, diethylaniline, dimethylparatoluidine and combinations thereof. Preferably, the composition of the at least one layer A further comprises at least one drier, wherein the at least one drier is a metal salt of an organic acid, preferably the at least one drier is cobalt 2-ethylhexanoate.

In some preferred embodiments of the invention, the resin composition of the at least one layer A comprises at least one catalyst. Preferably, the at least one catalyst is an organic peroxide, preferably the at least one catalyst can be selected from peroxides derived from ketone, such as Methyl Ethyl Ketone Peroxide, Methyl Iso Butyl Ketone Peroxide, Acetyl Acetone Peroxide or Cyclohexanone Peroxide; Alcoyl Hydro Peroxides, such as Tert-Butyl Hydro Peroxide or Cumene Hydro peroxide; Diacyl peroxides, such as Benzoyl Peroxide or Lauroyl Peroxide; Dialcoyl peroxides such as Dicumyl Peroxide or Di-tert-Butyl Peroxide; Peresters such as Tert-Butyl Peroctoate or Tert-Butyl Perbenzoate; preferably the at least one catalyst is methyl ethyl ketone peroxide.

1.3. Layer A

In some embodiments, layer A can comprise from 20 to 50% fiber weight, for example from 25 to 35% fiber weight, based on the total weight of layer A. In some embodiments, layer A can comprise from 50 to 80% by weight of the polymer resin, based on the total weight of layer A. In particular embodiments, layer A comprises from 25 to 35% by weight of fibers, and from 65 to 75% by weight of the resin.

The present inventors have found that layer A comprising fibers embedded in resin composition as described herein adhere particularly well to adjacent layers B. Without wishing to be bound by theory, it is believed that during the curing of the article, the vinyl ester resin, present in the composition of layer A reacts with carboxyl and/or hydroxyl groups of the polyester of layer B. Furthermore, the resin composition provide excellent mechanical and chemical characteristics to layer A including high heat resistance, high hardness, high dimension stability and high chemical resistance, and a barrier to humidity.

In some embodiment, the article forms a body with an inner surface and an outer surface, with at least one layer A disposed on at least a part of the outer surface of the body and/or at least one layer A disposed on at least part of the inner surface of the body.

In some embodiment, the article forms a body with an inner surface and an outer surface, with at least one layer A disposed on at least a part of the outer surface of the body and wherein the outer surface of the body is further coated with coating composition.

In an embodiment, the coating composition is fire-retardant. Preferably, the coating composition comprising at least one agent for expansion by thermal decomposition selected from the group comprising melamine and melamine derivatives, guanidine, glycine, urea, triisocyanurates and azodicarbonamide, preferably melamine and derivatives; and more preferably melamine.

In an embodiment, said coating composition further comprises at least one phosphorus derivative and/or at least one boric acid derivative, preferably ammonium borate, preferably wherein the at least one phosphorus derivative is preferably a phosphorus derivative selected from: phosphonates and/or phosphates and/or corresponding acids and/or salts or red phosphorus, and particularly preferably selected from: urea phosphates or ammonium phosphates and/or ammonium polyphosphates, and more preferably from: ammonium polyphosphates. In a preferred embodiment, said coating composition comprises at least one phosphate component selected from the group comprising of ammonium polyphosphate (APP) and melamine phosphates and mixtures thereof.

In a preferred embodiment, said coating composition further comprises at least one agent which is a precursor of charring. Preferably said at least one agent is selected from the group comprising polyfunctional polyols, preferably with a functionality of at least 4, including alkoxylated polyfunctional polyols, and preferably selected from: sugars, starch, potato flour, pentaerythritol (PET) and/or derivatives of PET and/or erythritol and/or sorbitol, these derivatives of PET being alkoxylated pentaerythritol (PET), and/or di- and/or tripentaerythritol and more preferably selected from: pentaerythritol and/or derivatives of PET and more preferably still pentaerythritol and alkoxylated pentaerythritol.

In an embodiment, the outer layer of the article comprises at least one layer A. In an embodiment, the outer layer comprises at least one layer A, and the coating composition is provided on said at least one layer A.

In another embodiment, the article comprises at least one layer A as inner layer and at least one layer A as outer layer.

2. Layer B

In addition to the layer(s) A, the article of the invention further comprises a layer B, wherein at least one layer A is in contact with layer B, wherein layer B comprises a composition comprising:

- from 40 to 100%, preferably from 75 to 100%, by weight relative to the total weight of said layer B of at least one thermoplastic polyester;
- from 0 to 60% by weight relative to the total weight of said layer B of a polyolefin composition; said composition comprising at least one polyolefin; and
- from 0 to 20% by weight relative to the total weight of said layer B of at least one additive selected from compatibilizing agent and/or impact modifier.
- wherein said layer B is selected from the group comprising a blow moulded layer, an injected moulded layer, an extruded-thermoformed layer, a sheet extruded layer, a pipe extruded layer, and an injection stretch-blow moulded layer.

In some embodiments, layer B has an average thickness of at least 2 μm, for example from 2 μm to 20 mm.

2.1. Thermoplastic Polyester (e.g. PLA)

Preferably, the at least one polyester used in layer B is an at least one thermoplastic polyester. The thermoplastic polyester is preferably selected from the group comprising poly(lactic acid) (PLA), polyhydroxyalkanoate (PHA), polycaprolactone (PCL), copolyesters, polyesteramides, copolymer of polylactic acid (e.g. such as copolymer of lactic acid and trimethylene carbonate, lactic acid and urethane), and any combination thereof. A non-limiting example of a suitable copolyester includes Tritan™ copolyester from Eastman: a copolyester based on the use of 2,2,4,4-tetramethyl-1,3-cyclobutanediol (TMCD) as a comonomer.

The thermoplastic polyester, for example PLA, is preferably present in an amount ranging from at least 40% by weight, for example at least 50% by weight, for example at least 60% by weight, for example at least 65% by weight, for example at least 70% by weight, for example at least 75% by weight, for example at least 80% by weight, for example at least 90% by weight, for example at least 95% by weight, for example at least 96% by weight, for example at least 97% by weight, for example at least 98% by weight, for example at least 99% by weight, for example at least 99.4% by weight, for example at least 99.5% by weight up to 100% by weight by weight based on the total weight of layer B (of the composition of layer B). In particular embodiments, the thermoplastic polyester, for example PLA, is present in an amount ranging from 50 to 100% by weight of layer B, for example the polyester is present in an amount ranging from 60 to 100% by weight of layer B, for example, the polyester is present in an amount ranging from 70 to 100% by weight of layer B, more preferably 75 to 100% by weight. In certain embodiments, the polyester, for example PLA, is present in an amount ranging from 70 to 100% by weight of layer B, more preferably from 90 to 100% by weight by weight of layer B. Most preferably, the polyester is PLA.

The PLA (also known as polylactide) is preferably a thermoplastic resin derived from renewable resources. Suitable PLA also includes copolymers of lactic acid. For instance, copolymers of lactic acid and trimethylene carbonate according to EP application number 11167138 and copolymers of lactic acid and urethanes according to WO 2008/037772 and PCT application number PCT/EP2011/ 057988. In some embodiments, the introduction of comonomers to PLA increases the ductility (i.e. decreases the brittleness) of the PLA.

Preferably, the PLA used in layer B of the article of the invention can be a poly-L-lactide (PLLA), a poly-D-lactide (PDLA) and/or a mixture of PLLA and PDLA. By PLLA, it is meant a polymer in which the majority of the repetitive units are monomers of L-lactide and by PDLA, a polymer in which the majority of the repetitive units are D-lactide monomers. Stereocomplexes of PLLA and PDLA, as described for example in WO 2010/097463, can also be used. Preferably, the polylactide used is the PLLA. Preferably, the PLLA or the PDLA respectively have an optical purity (called isomeric purity) of the L or D isomer, which is higher than 92% by weight of the PLA, preferably higher than 95% by weight. An optical purity from at least 98.5% by weight is more preferred. The PLLA used in layer B thus includes a content of D isomer lower than 8% by weight, preferably lower than 5% by weight, more preferably lower or equal to 1% by weight of the PLLA. By analogy, the PDLA includes a content of L isomer lower than 8% by weight, preferably lower than 5% by weight, more preferably lower or equal to 1% by weight of the PDLA.

PLA (PLLA or PDLA) preferably has a weight average molecular weight (Mw) ranging between 30.000 and 500.000 g/mol, more preferably between 50.000 and 400.000 g/mol, even more preferably between 50.000 and 300.000 g/mol. The weight average molecular weight is measured by chromatography by gel permeation (GPC) compared to polystyrene standards in chloroform at 30° C. The ratio of the weight average molecular weight (Mw) to the Mn is generally between 1.0 and 5.0.

The process for preparing PLA is well-known by the person skilled in the art. For example PLA can be obtained by the process describes in documents WO1998/002480, WO 2010/081887, FR2843390, U.S. Pat. No. 5,053,522, 5,053,485 or 5,117,008. Preferably, the PLA used in layer B has R—OH and R—COOH, chain termination, and was obtained using a monoalcohol as co-initiator and transfer agent of the polymerization.

Preferably, the PLA used in layer B has a crystallinity index (CI), as measured by XRD, of at least 5%. Preferably the crystallinity index of the PLA is at most 60%.

In some embodiment, the PLA used in layer B can be in the form of pellets or in the form of particles with an average particle size between 20 µm and 2000 µm, for example between 50 and 1000 µm is preferred and preferably is the average particle size of between 100 and 800 µm. In the present invention, by particles one understands "grains", which can be spherical, and/or ovoid forms, or can be of any other shapes or forms. The size corresponds to the longest dimension of these particles. The PLA for use in layer B can be in the form of pellets, micropellets or powders. The particles of PLA can be also obtained by grinding/milling pellets of PLA whose dimension is higher than 2000 µm, for example pellets whose dimension lies between 4000 µm and 5000 µm. In this case, the grinding of PLA pellets can be carried out by various types of grinders, such as for example a grinder with a disc, a mill, or an electromagnetic grinder, for example with a piston. Grinding can be done at room temperature or cryogenically, i.e. carried out at a temperature ranging between −10 and −200° C., preferentially between −20 and −100° C. Grinding can be carried out under inert atmosphere, i.e. in the absence of oxygen; for example under nitrogen.

The PLA can be used as such without the addition of other compounds or can be mixed with various compounds, loads, agents and/or additives. Many methods of mixing PLA with such additives can be used: mixing the additives with PLA in the melt or adding the additives directly to the mould with the PLA. Some of these additives can even be added during the polymerization of the PLA. The PLA can thus include antioxidants, and light and heat stabilizers, as well as anti-UV agents such as 2-(2-Hydroxy-5-tert-octylphenyl) benzotriazole commercially available under the name CYASORB® UV-5411 Light Absorber from Cytec. For example, suitable antioxidants include compounds containing phenol functional groups. One can use antioxidants called "primaries" such as compounds 1,3,5-TRIS(4-tert-butyl-3-hydroxy-2,6-dimethylbenzyl)-1,3,5-triazine-2,4,6-(1H,3H, 5H)-trione, commercially available under the name Cyanox® 1790 from Cytec. One can also use antioxidants called "secondaries" such as compounds containing phosphite functional groups such as Ultranox® 626 from Chemtura, or Irgafos® 168 from BASF. When one of these additives is present, its concentration in the PLA preferably lies between 0.05% by weight and 5% by weight.

Fillers, impact resistance modifiers and other additives can also be included. Fillers are preferentially selected from the group of fibrous compositions such as glass fibers, metal fibers, carbon fibers, minerals such as clays, kaolin, or nanoparticles such as carbon nanotubes, and powders such as talc.

Other additives which can be used include but are not limited to, for example, fire retardants, lubricants, plasticizers, anti-static agents, pigments, dyes, surfactants. Among plasticizers, one can in particular select those of the family of citrates, in particular citrate esters like citrate of terbutylene (TBC) or butyrate esters like tri-ethylene glycol di 2-ethyl hexylbutyrate or their mixtures. Preferably, TBC is used.

The polyester, in particular PLA, can then be blended either in dry form or in the melt with the optional polyolefin, to create the composition required for layer B.

In another embodiment of layer B, the PLA, optional polyolefin and optional additive (compatibilizer and/or impact modifier) are compounded together according to any known compounding method in the art, e.g. mixer, like a Banbury mixer, or an extruder, preferably a twin screw extruder. The extrusion is generally carried out at a temperature below 230° C.

2.2. Optional Polyolefin of Layer B (e.g. Polyethylene)

The optional polyolefin composition of layer B comprises at least one polyolefin, preferably said at least one polyolefin is polyethylene.

The at least one polyolefin is optionally present in layer B preferably in an amount ranging from 0.0% by weight based on the total weight of layer B up to 60% by weight, for example from at least 0.0.1% by weight based on the total weight of layer B, for example at least 0.5% by weight, for example at least 1% by weight, for example at least 2% by weight, for example at least 5% by weight, for example at least 10% by weight, for example at least 15% by weight, for example at least 20% by weight of layer B, for example at least 25% by weight, for example at least 30% by weight, for example at least 35% by weight, for example at least 40% by weight, for example at least 45% by weight, for example at least 50% by weight, for example at least 55% by weight, up to 60% by weight of layer B. In certain embodiments, the polyolefin is present in an amount ranging from 0.1 to 50% by weight of layer B, more particularly from 0.1 to 25% by weight of layer B, most particularly from 1 to 20% by weight of layer B. However, it is also envisaged that in certain embodiments, layer B does not comprise a polyolefin.

The polyolefin can be selected from polyethylene, polypropylene, polybutene or polyhexene.

Preferably, the polyolefin is polyethylene. With polyethylene herein it is meant a polyethylene comprising at least 50% by weight of ethylene monomers. The polyethylene may comprise up to 50% by weight of alpha-olefin comonomers selected from alpha-olefins having from 3 to 12 carbon atoms. Preferably, the comonomer is selected from propylene, n-butene, iso-butene, n-pentene, iso-pentene, n-butene or iso-butene.

The polyethylene can be prepared with a chromium, a Ziegler-Natta catalyst, or a single-site catalyst, such as a metallocene, according to any known polymerization process in the art. Preferably, the polyethylene is prepared with a single-site catalyst, in particular with a metallocene catalyst. This induces a narrow molecular weight distribution, regular comonomer insertion, and uniform comonomer distribution. Preferably, the polyethylene has a narrow molecular weight distribution of from 1 to 5 (measured by GPC). Preferably the polyethylene has a narrow comonomer distribution index (CDBI) i.e. of at least 50%, preferably at least 60%, more preferably at least 75%, measured by TREF (temperature rising elusion fractionation).

Any metallocene known in the art can be used to prepare the polyethylene. In one embodiment, the metallocene can be an unbridged metallocene, for example, selected from the group comprising bis(iso-butylcyclopentadienyl) zirconium dichloride, bis(pentamethylcyclopentadienyl) zirconium dichloride, bis(tetrahydroindenyl) zirconium dichloride, bis(indenyl) zirconium dichloride, bis(1,3-dimethylcyclopentadienyl) zirconium dichloride, bis(methylcyclopentadienyl) zirconium dichloride, bis(n-butylcyclopentadienyl) zirconium dichloride, and bis(cyclopentadienyl) zirconium dichloride; and preferably selected from the group comprising bis(cyclopentadienyl) zirconium dichloride, bis(tetrahydroindenyl) zirconium dichloride, bis(indenyl) zirconium dichloride, and bis(1-methyl-3-butyl-cyclopentadienyl)zirconium dichloride. In another embodiment, the metallocene can be a bridged metallocene, for example, selected from the group comprising ethylene bis(4,5,6,7-tetrahydro-1-indenyl) zirconium dichloride, ethylene bis(1-indenyl) zirconium dichloride, dimethylsilylene bis(2-methyl-4-phenyl-inden-1-yl) zirconium dichloride, dim ethylsilylene bis(2-methyl-1H-cyclopenta[a]naphthalen-3-yl) zirconium dichloride, cyclohexylmethylsilylene bis[4-(4-tert-butylphenyl)-2-methyl-inden-1-yl] zirconium dichloride, dimethylsilylene bis[4-(4-tert-butylphenyl)-2-(cyclohexylmethyl)inden-1-yl] zirconium dichloride. Bridged bis(tetrahydroindenyl) metallocenes are preferred, in particular ethylene bis(4,5,6,7-tetrahydro-1-indenyl) zirconium dichloride.

The polyethylene preferably has a density of at least 0.900 g/cm$^3$, more preferably at least 0.910 g/cm$^3$, even more preferably of at least 0.920 g/cm$^3$ and most preferably of at least 0.930 g/cm$^3$. In an embodiment, the polyethylene has a density of at most 0.965 g/cm. Most preferably, the polyethylene has a density of at least 0.932 to 0.965 g/cm$^3$. The density is measured following the method of standard test ISO 1183 at 23° C.

The polyethylene preferably has a melt index MI2 of at least 0.05 dg/min, preferably of at least 0.1 dg/min, more preferably of at least 0.2 dg/min. It is preferably at most 2 dg/min, more preferably at most 1.5 dg/min. Most preferably, the polyethylene has an MI2 of at least 0.1 dg/min to at most 1.5 dg/min. The melt flow index MI2 is measured following the method of standard test ISO 1133 condition Data temperature of 190° C. and a load of 2.16 kg.

The polyethylene preferably has a high load melt index HLMI of at least 0.1 dg/min, preferably of at least 0.5 dg/min, more preferably of at least 1 dg/min. It is preferably at most 20 dg/min, more preferably at most 10 dg/min, and most preferably at most 5 dg/min. Most preferably, the polyethylene has an HLMI of at least 0.5 dg/min to at most 5 dg/min. The high load melt flow index HLMI is measured following the method of standard test ISO 1133 condition G at a temperature of 190° C. and a load of 21.6 kg.

Most preferably, the polyolefin used in layer B is a polyethylene prepared in the presence of an ethylene bis(4,5,6,7-tetrahydro-1-indenyl) zirconium dichloride metallocene catalyst, wherein the polyethylene has a density of 0.930 to 0.965 g/cm$^3$.

The polyolefin of layer B may contain additives, such as, by way of example, processing aids, mould-release agents, anti-slip agents, primary and secondary antioxidants, light stabilizers, anti-UV agents, acid scavengers, flame retardants, fillers, nanocomposites, lubricants, antistatic additives, nucleating/clarifying agents, antibacterial agents, plasticizers, colorants/pigments/dyes and mixtures thereof. Preferably the polyolefin comprises an anti-UV agent. Illustrative pigments or colorants include titanium dioxide, carbon black, cobalt aluminum oxides such as cobalt blue, and chromium oxides such as chromium oxide green. Pigments such as ultramarine blue, phthalocyanine blue and iron oxide red are also suitable. Specific examples of additives include lubricants and mould-release agents such as calcium stearate, zinc stearate, SHT, antioxidants such as Irgafos 168™, Irganox 1010™, and Irganox 1076™, anti-slip agents such as erucamide, light stabilizers such as Cyasorb THT 4611 and 4802, tinuvin 622™ and tinuvin 326™, and nucleating agents such as Milliken HPN20E™, or Milliken Hyperform® HPR-803i.

An overview of the additives that can be used in the moulded articles of the present invention may be found in Plastics Additives Handbook, ed. H. Zweifel, 5th edition, 2001, Hanser Publishers.

In a preferred embodiment of layer B, the PLA, optional polyolefin and optional additive (co- or ter-polymer) are compounded together according to any known compounding method in the art, e.g. mixer, like a Banbury mixer, or an extruder, like a twin screw extruder. The extrusion is generally carried out at a temperature below 230° C.

2.3 The Optional Additive Selected from Compatibilizing Agent and/or Impact Modifier of Layer B (e.g. Co- or Ter-Polymer)

In an embodiment, layer B comprises from 0 to 20% by weight based on the total weight of layer B of at least one additive selected from compatibilizing agent and/or impact modifier. Preferably the compatibilizing agent and/or impact modifier is at least one co- or ter-polymer comprising ethylene or styrene monomer; an unsaturated anhydride containing monomer, unsaturated epoxide containing monomer or unsaturated carboxylic acid containing monomer; and optionally a (meth)acrylic ester monomer.

When present, the co- or ter-polymer acts as a compatibilizer between the polyester and the polyolefin. It also acts as a chain modifier. If present, the co- or ter-polymer is preferably present from 0.1 to 20% by weight, more preferably from 0.1 to 15% by weight, even more preferably from 0.5 to 10% by weight, most preferably from 1 to 5% by weight based on total weight of layer B.

Preferably, the optional co- or ter-polymer comprises:
(a) 50 to 99.9% by weight of ethylene or styrene monomer,
(b) 0.1 to 50% by weight, preferably 1 to 50% by weight, of an unsaturated anhydride containing monomer, unsaturated epoxide containing monomer or unsaturated carboxylic acid containing monomer,
(c) 0 to 50% by weight of a (meth)acrylic ester monomer, preferably from 0.1 to 50% by weight of a (meth)acrylic ester monomer;
the sum of the weight percentages relating to the above-mentioned compounds of said co- or ter-polymer being equal to 100%.

Preferably, the article comprises:
(i) at least one layer A comprising fibers embedded in a composition comprising at least one vinyl ester resin; and
(ii) a layer B comprising:
from 40 to 100%, preferably from 75 to 100% by weight relative to the total weight of said layer B of at least one thermoplastic polyester;
from 0 to 60% by weight relative to the total weight of said layer B of a polyolefin composition; said composition comprising at least one polyolefin, preferably said at least one polyolefin is polyethylene; and
from 0 to 20% by weight relative to the total weight of said layer B of at least one additive selected from compatibilizing agent and/or impact modifier; wherein said additive (compatibilizing agent and/or impact modifier) is at least one co- or ter-polymer comprising ethylene or styrene monomer; an unsaturated anhydride containing monomer, unsaturated epoxide containing monomer or unsaturated carboxylic acid containing monomer; and optionally a (meth)acrylic ester monomer;
wherein said layer B is selected from the group comprising a blow moulded layer, an injected moulded layer, an extruded-thermoformed layer, a sheet extruded layer, a pipe extruded layer, and an injection stretch-blow moulded layer; and at least one layer A is in contact with layer B.

Preferably, the article comprises:
(i) at least one layer A comprising fibers embedded in a composition comprising at least one vinyl ester resin; and
(ii) a layer B comprising:
from 40 to 100%, preferably from 75 to 100% by weight relative to the total weight of said layer B of at least one thermoplastic polyester;
from 0 to 60% by weight relative to the total weight of said layer B of a polyolefin composition; said composition comprising at least one polyolefin, preferably said at least one polyolefin is polyethylene; and
from 0 to 20% by weight relative to the total weight of said layer B of at least one additive selected from compatibilizing agent and/or impact modifier; wherein said additive is at least one co- or ter-polymer comprising (a) 50 to 99.9% by weight of ethylene or styrene monomer, (b) 0.1 to 50% by weight, preferably 1 to 50% by weight, of an unsaturated anhydride containing monomer, unsaturated epoxide containing monomer or unsaturated carboxylic acid containing monomer, and (c) 0 to 50% by weight of a (meth)acrylic ester monomer, preferably from 0.1 to 50% by weight of a (meth)acrylic ester monomer;
wherein said layer B is selected from the group comprising a blow moulded layer, an injected moulded layer, an extruded-thermoformed layer, a sheet extruded layer, a pipe extruded layer, and an injection stretch-blow moulded layer, and wherein at least one layer A is in contact with layer B.

In all embodiments of the co- or ter-polymer, the ethylene or styrene monomer (a) is present from 50 to 99.9% by weight, preferably from 50 to 99.8% by weight, more preferably from 60 to 99.5% by weight, even more preferably from 65 to 99% by weight, most preferably from 70 to 98% by weight. In an embodiment of the copolymer, the ethylene or styrene monomer is present from 90 to 98% by weight.

In all embodiments of the co- or ter-polymer, the unsaturated monomer (b) is preferably selected from an unsaturated anhydride- or epoxide-containing monomer. More preferably, the unsaturated monomer (b) is selected from a glycidyl (meth)acrylate or maleic anhydride. The unsaturated monomer (b) is preferably present from 0.1 to 40% by weight, more preferably from 0.2 to 30% by weight, even more preferably from 0.3 to 20% by weight, yet even more preferably from 0.3 to 15% by weight and most preferably from 0.3 to 10% by weight of the co- or ter-polymer.

The (meth)acrylic ester monomer (c), if present, is preferably selected from those acrylates which have between 1 and 10 carbon atoms such as for example methyl (meth) acrylate, ethyl (meth)acrylate, n-butyl (meth)acrylate, iso-butyl (meth)acrylate, 2-ethylhexyl (meth)acrylate, or n-octyl (meth)acrylate. If present, it preferably makes up 0.1 to 50% by weight of the terpolymer, preferably 0.5 to 40% by weight, more preferably 1 to 30% by weight, even more preferably 2 to 25% by weight and most preferably 5 to 25% by weight of the terpolymer.

The co-polymers of ethylene or styrene monomer and of a glycidyl (meth)acrylate or maleic anhydride can contain from 50 to 99% by weight of ethylene or styrene monomer and from 1 to 50% by weight of a glycidyl (meth)acrylate or maleic anhydride, preferably from 90 to 98% by weight of ethylene or styrene monomer and from 2 to 10% by weight of a glycidyl (meth)acrylate or maleic anhydride, based on the total weight of the co- or ter-polymer.

The ter-polymers of ethylene or styrene monomer, of a glycidyl (meth)acrylate or maleic anhydride and of a (meth) acrylic ester monomer can contain from 50 to 98.8% by weight of ethylene or styrene monomer, from 0.2 to 10% by weight of a glycidyl (meth)acrylate or maleic anhydride and from 1 to 50% by weight of a (meth)acrylic ester monomer e.g. methyl acrylate, based on the total weight of the ter-polymer. Preferably the terpolymer can contain from 55 to 97.7% by weight of ethylene or styrene monomer, from 0.3 to 8% of a glycidyl (meth)acrylate or maleic anhydride, and from 2 to 35% of (meth)acrylic ester monomer, based on the total weight of the ter-polymer.

More preferably, the co- or ter-polymer is selected among copolymers of ethylene and glycidyl methacrylate and ter-polymers of ethylene or styrene, acrylic ester monomers and glycidyl methacrylate or maleic anhydride. Preferably, at least one additive selected from compatibilizing agent and/or impact modifier of layer B is at least one co- or ter-polymer is selected from the group comprising copolymers of ethylene and glycidyl methacrylate; terpolymers of ethylene, acrylic ester monomers, and glycidyl methacrylate; terpolymers of styrene, acrylic ester monomers, and glycidyl methacrylate; terpolymers of ethylene, acrylic ester monomers, and maleic anhydride; terpolymers of styrene, acrylic ester monomers, and maleic anhydride; and any combination thereof; preferably, the compatibilizing agent is a copolymer of ethylene and glycidyl methacrylate. Preferred co- or terpolymer can be selected from the copolymer of ethylene and glycidyl methacrylate sold under the trademark Lotader®AX 8840 by Arkema France, the terpolymer of ethylene, ethylacrylate and maleic anhydride sold under the denomination Lotader®4700 by Arkema France, the terpolymer of ethylene monomer, glycidyl methacrylate and methyl acrylate sold under the denomination Lotader®AX8900 by Arkema France (68% by weight of ethylene monomer, 8% by weight of glycidyl methacrylate and 24% by weight methyl acrylate); as well as the terpolymer of styrene monomer, acrylic esters and glycidyl methacrylate sold under the trademark Joncryl® by BASF.

The co- or terpolymer, is then blended either in dry form or in the melt with the polyolefin, in particular a polyethylene, and the polyester, in particular PLA, to create the composition required for layer B.

The co- or terpolymer and the polyester can be added one by one to the polyolefin and mixed after each addition or they can be added together and mixed together once.

In a preferred embodiment of layer B, the PLA, polyolefin and the compatibilizing agent and/or impact modifier are compounded together according to any known compounding method in the art, e.g. mixer, like a Banbury mixer, or an extruder, preferably a twin screw extruder. The extrusion is generally carried out at a temperature below 230° C.

3. The Process for Forming an Article According to the Invention

The present invention also encompasses a method for preparing an article according to the invention, comprising the steps of
  (i) forming a layer B; wherein said layer B is formed by a process selected from the group comprising blow moulding, injection moulding, extrusion-thermoforming, sheet extrusion, pipe extrusion, and injection stretch-blow moulding;
    said layer B comprising:
      from 40 to 100%, preferably from 75 to 100% by weight relative to the total weight of said layer B of at least one thermoplastic polyester;
      from 0 to 60% by weight relative to the total weight of said layer B of a polyolefin composition; said composition comprising at least one polyolefin, preferably said at least one polyolefin is polyethylene; and
      from 0 to 20% by weight relative to the total weight of said layer B of at least one additive selected from compatibilizing agent and/or impact modifier;
  (ii) applying to at least a part of one of the surface of layer B at least one layer A comprising fibers embedded in a composition comprising at least one vinyl ester resin; wherein at least one layer A is contacting layer B, thereby obtaining the article according to the invention.

Blow-moulded articles may be produced by a process comprising melt-extruding the composition for layer B as defined above to produce a parison of molten composition. The parison of molten composition can then be clamped into a mould, so that the parison is closed-off at both ends, i.e. forms a closed hollow volume inside. In the following, gas (such as air, nitrogen or any other inert gas) under pressure can be injected into the closed-off parison so that the parison can be expanded to take the shape of the mould, thus obtaining an expanded parison having the shape of the mould, which can be subsequently cooled, and finally the blow-moulded layers/article can be ejected. In an embodiment, the process comprises prior to clamping the parison into a mould, optionally applying to at least a part of the interior wall of said mould at least one layer A. In certain embodiments, layer A may be applied to the blow moulded layer B once released from the mould for example. Alternatively, the fibers may be applied to the moulded layers first, and subsequently impregnated with the resin composition of layer A. In some embodiments, layer A may be applied on the inner surface of the blowmoulded layers using centrifugation. A more detailed description of the blow-moulding process may for example be found in N. C. Lee, Practical Guide to Blow Moulding, Rapra Technology Limited, Shrewsbury, 2006.

Hence, the present invention also encompasses a process for the production of blow-moulded articles comprising the following steps:
  (a) melt-extruding a composition for layer B to form a parison of molten composition;
  (b) clamping the parison into a mould so that the parison is closed off at both ends to form a clamped-off parison;
  (c) optionally prior to clamping the parison into a mould, applying to at least a part of the interior wall of said mould at least one layer A;
  (d) injecting a gas under pressure into the clamped-off parison to obtain an expanded parison having the shape of the mould;
  (e) cooling and ejecting the blow-moulded article/layers;
  (f) optionally applying to at least a part of the inner surface of the blow moulded layers at least one layer A comprising one or more layers of fibers impregnated with the resin composition;
  (g) optionally applying to at least a part of the outer surface of the blow moulded layers at least one layer A comprising one or more layers of fibers impregnated with the resin composition.
  (h) optionally curing said at least one layer A;
  wherein at least one of steps (a), (f) or (g) is not optional.

The blow moulded articles prepared according to the present invention are hollow containers and bottles that can be used in applications. The present blow-moulded article can be for example structural parts, tanks, drums, containers, vats, jerrycans, cans, cisterns, boxes, bumpers, furniture (bath tubs), car parts such as car doors, car bodies and car seats, nautical and aquatic equipment, buoys, floats, airplane parts, boards, planks and joints.

Thermoformed articles may be produced by a process comprising the steps of producing a sheet of layer B by melt-extruding the composition for layer B, shaping said sheet (thermoforming stage), wherein one or more layer A can be applied either before the thermoforming stage and after said thermoforming.

The sheet may be produced on any melt extrusion sheet line, the production process for example comprising the steps of (a) providing a composition for layer B to an extruder, (b) subsequently melting the composition in the extruder to obtain a molten composition, (c) melt-extruding the molten composition obtained in step (b) through a slit die to form an extrudate, and (d) cooling the extrudate to obtain a sheet of layer B.

A more detailed description of the thermoforming process may for example be found in J. L. Throne, Understanding Thermoforming, Carl Hanser Verlag, Munich, 1999 and in J. L. Throne, Thermoforming, Carl Hanser Verlag, Munich, 1987.

Injection-moulded articles may be produced by a process comprising
  (a) melting the composition for layer B,
  (b) optionally prior to injecting the molten composition into an injection mould, applying to at least a part of the interior wall of said mould at least one layer A;
  (c) injecting the molten composition for layer from step (a) into an injection mould to form an injection-moulded layer B;

(d) optionally applying to at least a part of the surface of the injection moulded layer B at least one layer A comprising one or more layers of fibers impregnated with the resin composition.

(e) optionally curing said at least one layer A;

wherein at least one of steps (b), or (d) is not optional.

Injection stretch-blow moulded articles can be produced using methods and equipment well known to the person skilled in the art.

The pipes or pipe parts can be produced using methods and equipment well known to the person skilled in the art.

The invention is particularly useful for preparing reinforced articles such as reinforced blow moulded articles, reinforced injection moulded articles, reinforced extrusion-thermoformed articles, reinforced sheet extruded articles, reinforced pipes, and reinforced injection stretch-blow moulded articles.

In some embodiments, the articles according to the invention can also be used as part assembly to produce hollow articles.

EXAMPLES

The following examples illustrate the invention, but by no means intend to limit the scope of the invention.

Example 1

Materials Used in the Example

Layer B: Thermoplastic Polyester=PLA

As the polyester, a PLA was used, namely a poly-L-lactide (PLLA 6201D from Natureworks).

The properties of PLLA 6201D are given in Table 1.

TABLE 1

| PURITY[1] | | | |
|---|---|---|---|
| L-poly-Lactide content | % w/w | Min. 99 | |
| Water content | ppm | Max. 250 | |
| Free Lactide content | % w/w | Max. 0.4 | |
| PHYSICAL PROPERTIES PLA POLYMER[1] | | | |
| Specific Gravity @25° C. | | 1.24 | ISO 1183 |
| Melt Density @230° C. | | 1.08-1.12 | |
| Melt Index @190° C./2.16 kg | g/10 min | 10-14 | ISO 1133 |
| Haze (2 mm) | % | <5 | ISO 14782 |
| Transmittance (2 mm) | % | >90 | ISO 14782 |
| Glass Transition Temperature | ° C. | 55-60° C. | ISO 11357 |
| Crystalline Melt Temperature | ° C. | 175-180° C. | ISO 11357 |

[1]Typical properties; not to be construed as specifications.

Layer A: fibers impregnated with a composition comprising at least one vinyl ester resin The starting material used for layer A are listed in Table 2.

TABLE 2

| Product reference | Supplier | Technical function | Chemical nature |
|---|---|---|---|
| Epovia ® EP KRF 1100 | CCP composites | Vinyl ester resin | Vinyl ester based on bisphenol A: 0% styrene |
| Accelerator ® NL-23 | Akzo Nobel | Accelerator of peroxide | Solution of cobalt 2-ethylhexanoate salt and of dimethylaniline in a white spirit |
| Luperox K12 | Arkema | Peroxide initiator | Methyl ethyl ketone peroxide |
| Mat 123 | Vetrotex | Glass fibre reinforcement | Glass mat comprising powder binder - Mat 450 g/m² |

Preparation of the Articles:

A sheet of layer B was manufactured by injection moulding PLLA 6201D. Samples (11 cm×11 cm) were cut out of the sheet. 5 layers A were applied to the samples. The first step of stratification of the cut sample comprised applying a first layer comprising 450 g/m² glass mat with Epovia® EP KRF 1100 resin (and 0.5 wt. % NL 23 and 1.5 wt. % Luperox K12), the ratio glass to resin was about 30%. This step was repeated 5 times. The final layered product was cured for 2 h at 60° C.

Adhesion Test:

The layered samples (11 cm×11 cm) were submitted to tearing tests, which tested the adhesion of layers A to layer B. The test consisted in trying to separate the layers of the tested samples using perpendicular traction. The measurements were conducted with a traction device type Adamel Lhomargy DY 35. Using a 5 cm diameter hole saw the samples were cut until the interface layer A/layer B was reached. A 5 cm diameter metal disk having a threaded blind hole in its center was glued on the circular cut out section layer A using a cyano-acrylate glue. The assembly was maintained under pressure using clamps for about 1 hour. A bolt comprising a device configured to be attached to the traction device was then screwed on the metal disk. The assembly was connected to the traction device. The edges of the sample were further immobilized using two clamping devices, to avoid any translating movement during the traction test.

Figure 2:
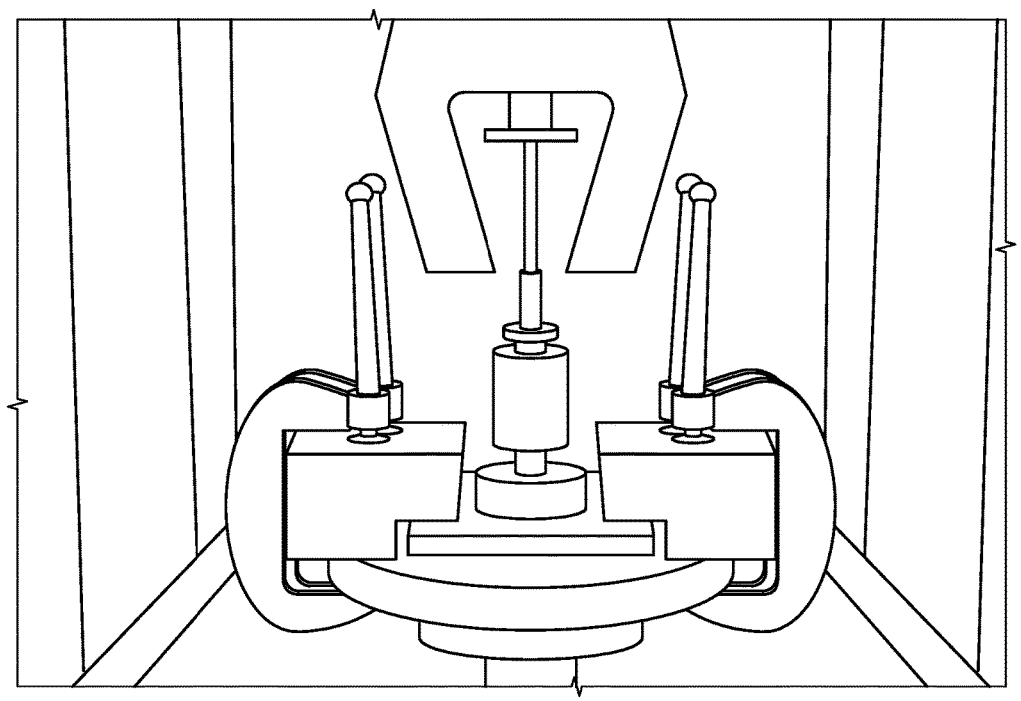
FIG. 2 is a picture of a test sample provided in an Adamel Lhomargy DY 35 device.

FIG. 1 schematically represents a test sample assembly 1, wherein the test sample comprises layer A 2 and layer B 3, having a disk 5 glued on the part of layer A delimited by a through 4. The disk 5 is further provided with a bolt 6 operably connected to traction device 7 which applies a force F 8. FIG. 2 shows a picture of the assembly provided in the test device. A comparative sample prepared with an epoxy resin instead of the vinyl ester resin was provided and tested. The break point was recorded by the sensors of the device. The results are listed in table 3.

TABLE 3

| Sample with epoxy resin | | | Sample with vinyl ester resin | | |
|---|---|---|---|---|---|
| test | Stress max (MPa) | Modulus (MPa) | test | Stress max (MPa) | Modulus (MPa) |
| 1 | 49.43 | 4222.54 | 1 | 51.66 | 7536.78 |
| 2 | 44.47 | 3306.06 | 2 | 50.89 | 8933.78 |
| | | | 3 | 55.67 | 5802.06 |
| Average | 46.95 | 3764.3 | Average | 52.74 | 7424.21 |
| Standard deviation | 2.48 | 458.24 | Standard deviation | 1.95 | 1081.43 |

The adhesion of layer A on layer B was at least 10% higher when layer A comprised vinyl ester resin instead of epoxy resin.

Example 2

Figure 3:
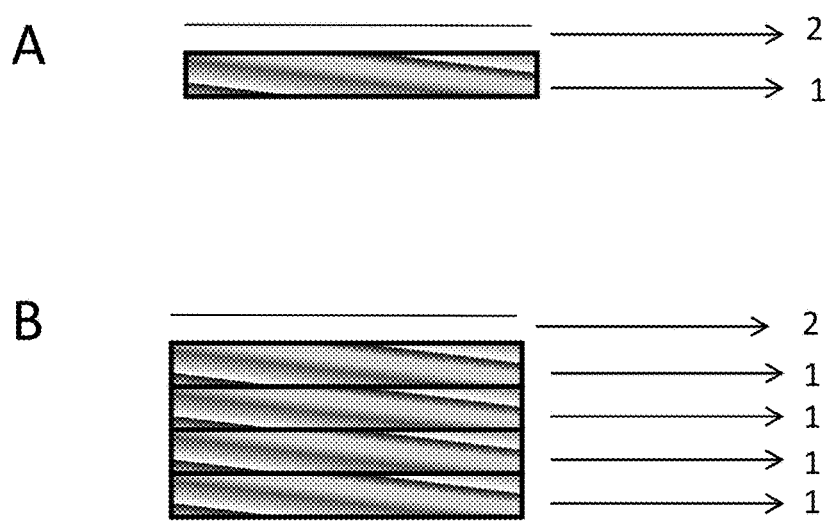
FIGS. 3 and 4 represent schematic overview of the layer structure for various embodiments of the articles described herein.
Figure 4:
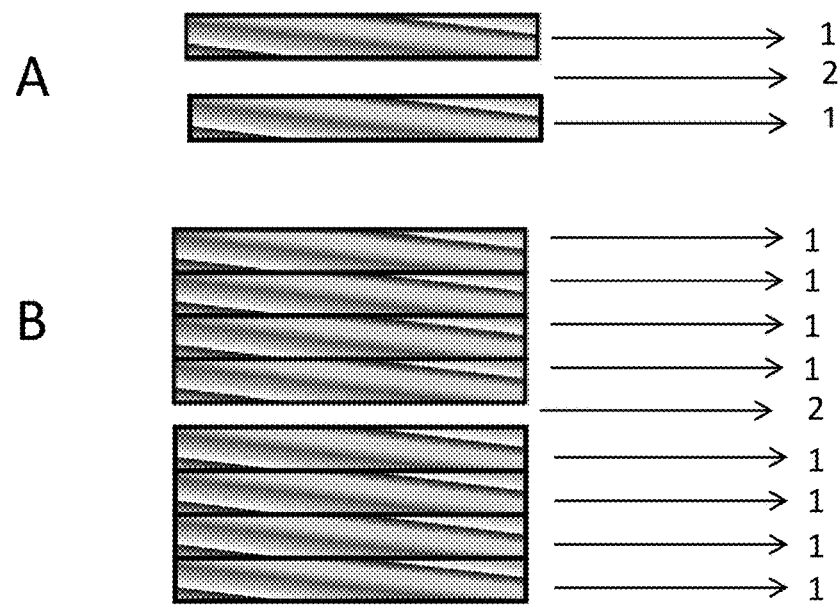

Different multilayered articles can be made according to the invention. FIGS. 3 and 4 represent schematic cross sectional view of multilayered structures for various embodiments of the articles described herein; wherein layers A and B have the compositions as described in the present specification and claims. In the figures layer A is numbered 1, layer B is numbered 2. FIG. 3A represents structure comprising one outer layer A and an inner layer B. FIG. 3B represents a similar structure, comprising a plurality of outer layers A and an inner layer B. Structure of FIG. 3B can comprise up to 10 layers A.

FIG. 4A represents a structure comprising one outer layer A, a first intermediate layer B, and an inner layer A. Layer B is therefore sandwiched between two layers A. FIG. 4B represents a similar structure, comprising a plurality of outer layers A and a plurality of inner layers A. Structure of FIG. 4B can comprise up to 10 outer layers A and up to 10 inner layers A.

The invention claimed is:
1. An article comprising
(i) at least one layer A comprising fibers embedded in a composition comprising at least one vinyl ester resin, wherein the at least one vinyl ester resin of the composition of the at least one layer A is produced by a process comprising contacting
at least one compound comprising at least one epoxy group per compound;
with at least one compound selected from the group consisting of a compound of formula $R^1$—C(=O)—O—$R^2$, and compound of formula (a)

(a)

wherein $R^1$ is selected from the group consisting of $C_{1-6}$alkyl, $C_{2-6}$alkenyl, $C_{2-6}$alkynyl; $C_{6-12}$aryl, $C_{6-12}$aryl$C_{1-6}$alkyl, and $C_{6-12}$aryl$C_{2-6}$alkenyl; each group being optionally substituted with one or more substituents each independently selected from the group consisting of $C_{1-6}$alkyl, $C_{2-6}$alkenyl, $C_{2-6}$alkynyl; carboxyl, hydroxyl, $C_{1-6}$alkyloxycarbonyl, $C_{2-6}$alkenyloxycarbonyl, $C_{2-6}$alkynyloxycarbonyl and $C_{6-12}$ aryl, and wherein $R^2$ is hydrogen or is selected from the group consisting of $C_{1-6}$alkyl, $C_{2-6}$alkenyl, $C_{2-6}$ alkynyl; $C_{6-12}$ aryl, $C_{6-12}$aryl$C_{1-6}$alkyl, and $C_{6-12}$aryl$C_{2-6}$alkenyl; each group being optionally substituted with one or more substituents each independently selected from the group consisting of $C_{1-6}$alkyl, $C_{2-6}$alkenyl, $C_{2-6}$ alkynyl, carboxyl, hydroxyl, $C_{1-6}$ alkyloxycarbonyl, $C_{2-6}$alkenyloxycarbonyl, $C_{2-6}$ alkynyloxycarbonyl; and wherein $L^1$ is a $C_{2-6}$alkenylene optionally substituted with one or more hydroxyl or $C_{1-6}$alkyl; and
(ii) a layer B comprising:
from 40 to 100% by weight relative to the total weight of the layer B of at least one thermoplastic polyester;
from 0 to 60% by weight relative to the total weight of the layer B of a polyolefin composition; the composition comprising at least one polyolefin; and
from 0 to 20% by weight relative to the total weight of the layer B of at least one additive selected from compatibilizing agent and/or impact modifier;
wherein the layer B is selected from the group consisting of a blow moulded layer, an injected moulded layer, an extruded-thermoformed layer, a sheet extruded layer, a pipe extruded layer, and an injection stretch-blow moulded layer, and wherein at least one layer A is in contact with layer B.

2. The article according to claim 1, wherein the at least one vinyl ester resin of the composition of the at least one layer A is produced by a process comprising contacting the at least one compound comprising at least one epoxy group per compound; with at least one methacrylic acid or an ester thereof.

3. The article according to claim 1, wherein the at least one compound comprising at least one epoxy group per compound is produced by a process comprising contacting at least one epihalohydrin with at least one polyphenol.

4. The article according to claim 1, wherein the at least one compound comprising at least one epoxy group per compound is produced by a process comprising contacting at least one epihalohydrin with at least one polyphenol; wherein the polyphenol is selected from the group comprising bis(4-hydroxyphenyl)-2,2-propane, bis(4-hydroxyphenyl)-1,1-isobutane, 4,4-dihydroxybenzophenone; bis(4-hydroxyphenyl-1,1-ethane; bis(2-hydroxynaphenyl)-methane; resorcinol, catechol, hydroquinone, 1,5-hydroxynaphtalene, and any combination thereof.

5. The article according to claim 1, wherein the at least one compound comprising at least one epoxy group per compound is a polyglycidyl ether of a polyphenol.

6. The article according to claim 1, wherein the composition of the at least one layer A further comprises:
at least one reactive selected from the group comprising styrene; vinyl toluene; a (meth)acrylate, methylmethacrylate, acrylate, methacrylate, glycidyl methacrylate, hydroxyl methyl methacrylate, hydroxy propylmethacrylate, acrylic acid, and methacrylic acid; and a combination thereof, and/or
at least one catalyst, wherein the at least one catalyst is an organic peroxide.

7. The article according to claim 1, wherein the composition of the at least one layer A is styrene free.

8. The article according to claim 1, wherein the at least one thermoplastic polyester in layer B is selected from the group comprising poly(lactic acid), copolymers thereof, polyhydroxyalkanoate, polycaprolactone, copolyesters, polyesteramides, and any combination thereof.

9. The article according to claim 1, wherein the at least one thermoplastic polyester in layer B is a poly(lactic acid).

10. The article according to claim 1, wherein the at least one additive selected from compatibilizing agent and/or impact modifier of layer B, is at least one co- or ter-polymer comprising:
(a) 50 to 99.9% by weight of ethylene or styrene monomer,
(b) 0.1 to 50% by weight of an unsaturated anhydride containing monomer, unsaturated epoxide containing monomer or unsaturated carboxylic acid containing monomer,
(c) 0 to 50% by weight of a (meth)acrylic ester monomer.

11. The article according to claim 1, wherein the at least one polyolefin in layer B is a polyethylene.

12. The article according to claim 1, wherein the article forms a body with an inner surface and an outer surface, wherein at least one layer A is disposed on at least a part of the outer surface of the body, and wherein the outer surface of the body is further coated with coating composition.

13. A method for preparing an article comprising:
(i) forming a layer B; wherein the layer B is formed by a process selected from the group consisting of blow moulding, injection moulding, extrusion-thermoforming, sheet extrusion, pipe extrusion, and injection stretch-blow moulding;
the layer B comprising:
from 40 to 100% by weight relative to the total weight of the layer B of at least one thermoplastic polyester;
from 0 to 60% by weight relative to the total weight of the layer B of a polyolefin composition; the composition comprising at least one polyolefin; and
from 0 to 20% by weight relative to the total weight of the layer B of at least one additive selected from compatibilizing agent and/or impact modifier;
(ii) applying to at least a part of one of the surface of layer B at least one layer A comprising fibers embedded in a composition comprising at least one vinyl ester resin, wherein the at least one vinyl ester resin of the composition of the at least one layer A is produced by a process comprising contacting
at least one compound comprising at least one epoxy group per compound;
with at least one compound selected from the group consisting of compound of formula $R^1$—C(=O)—O—$R^2$, and compound of formula (a)

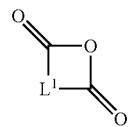

wherein $R^1$ is selected from the group consisting of $C_{1-6}$alkyl, $C_{2-6}$alkenyl, $C_{2-6}$alkynyl; $C_{6-12}$aryl, $C_{6-12}$aryl$C_{1-6}$alkyl, and $C_{6-12}$aryl$C_{2-6}$alkenyl; each group being optionally substituted with one or more substituents each independently selected from the group consisting of $C_{1-6}$alkyl, $C_{2-6}$alkenyl, $C_{2-6}$alkynyl; carboxyl, hydroxyl, $C_{1-6}$alkyloxycarbonyl, $C_{2-6}$alkenyloxycarbonyl, $C_{2-6}$alkynyloxycarbonyl and $C_{6-12}$ aryl, and wherein $R^2$ is hydrogen or is selected from the group consisting of $C_{1-6}$alkyl, $C_{2-6}$alkenyl, $C_{2-6}$alkynyl; $C_{6-12}$ aryl, $C_{6-12}$aryl$C_{1-6}$alkyl, and $C_{6-12}$aryl$C_{2-6}$alkenyl; each group being optionally substituted with one or more substituents each independently selected from the group consisting of $C_{1-6}$alkyl, $C_{2-6}$alkenyl, $C_{2-6}$ alkynyl, carboxyl, hydroxyl, $C_{1-6}$ alkyloxycarbonyl, $C_{2-6}$alkenyloxycarbonyl, $C_{2-6}$ alkynyloxycarbonyl; and wherein $L^1$ is a $C_{2-6}$alkenylene optionally substituted with one or more hydroxyl or $C_{1-6}$alkyl;

wherein at least one layer A is contacting layer B.

* * * * *